(12) United States Patent
Dutta

(10) Patent No.: US 12,047,157 B2
(45) Date of Patent: Jul. 23, 2024

(54) SINGLE-FREQUENCY BROADCASTING NETWORKS USING MULTIPLE SPOTBEAMS

(71) Applicant: ATC TECHNOLOGIES LLC, Reston, VA (US)

(72) Inventor: Santanu Dutta, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 380 days.

(21) Appl. No.: 17/574,121

(22) Filed: Jan. 12, 2022

(65) Prior Publication Data
US 2022/0224403 A1    Jul. 14, 2022

Related U.S. Application Data

(60) Provisional application No. 63/136,884, filed on Jan. 13, 2021.

(51) Int. Cl.
*H04B 7/185*    (2006.01)
(52) U.S. Cl.
CPC ............................ *H04B 7/18513* (2013.01)
(58) Field of Classification Search
CPC .................................................. H04B 7/18513
USPC ........................................................ 370/316
See application file for complete search history.

(56) References Cited

U.S. PATENT DOCUMENTS

| | | | | |
|---|---|---|---|---|
| 5,465,096 | A * | 11/1995 | Nawata | H04B 7/2041 455/12.1 |
| 5,966,442 | A * | 10/1999 | Sachdev | H04H 20/62 455/12.1 |
| 8,705,436 | B2 | 4/2014 | Dutta | |
| 2007/0192805 | A1 | 8/2007 | Dutta et al. | |
| 2008/0233952 | A1 | 9/2008 | Miller | |
| 2009/0220022 | A1 * | 9/2009 | Eberlein | H04B 7/208 375/267 |
| 2012/0309294 | A1 | 6/2012 | Jong et al. | |
| 2014/0286459 | A1 | 9/2014 | Eliaz et al. | |

(Continued)

OTHER PUBLICATIONS

International Search Report with Written Opinion for related Application No. PCT/US2022/012125 dated Apr. 7, 2022 (21 Pages).

*Primary Examiner* — Mark G. Pannell
(74) *Attorney, Agent, or Firm* — Michael Best & Friedrich LLP

(57) ABSTRACT

Systems and methods operating a spotbeam satellite network. One example embodiment provides a satellite broadcast system. The system includes an electronic processor communicatively coupled to a satellite, and a user equipment. The electronic processor receives a plurality of bearer signals, each bearing identical broadcast or multicast program information. For each of the plurality of bearer signals, the electronic processor generates one of a plurality of spotbeams for transmission by the satellite within a coverage area. The electronic processor introduces into the bearer signal of each spotbeam of the plurality of spotbeams a differential delay with respect to the bearer signals of each of the other spotbeams of the plurality of spotbeams The user equipment is receives the bearer signals from a plurality of adjacent spotbeams of the plurality of spotbeams. The user equipment constructively utilizes the bearer signals received from the plurality of adjacent spotbeams to decode the program information.

20 Claims, 7 Drawing Sheets

(56) References Cited

U.S. PATENT DOCUMENTS

| | | |
|---|---|---|
| 2014/0308893 A1 | 10/2014 | Miller |
| 2015/0131703 A1 | 5/2015 | Balter et al. |
| 2016/0011318 A1 | 1/2016 | Cohen |
| 2017/0215176 A1 | 7/2017 | Chan |
| 2020/0007227 A1 | 1/2020 | Becker et al. |
| 2020/0274594 A1 | 8/2020 | Zheng et al. |

* cited by examiner

SINGLE-FREQUENCY BROADCASTING NETWORKS USING MULTIPLE SPOTBEAMS

CROSS-REFERENCE TO RELATED APPLICATIONS

The present application is related to and claims benefit under 35 U.S.C. § 119(e) from U.S. Provisional Patent Application Ser. No. 63/136,884, filed Jan. 13, 2021, entitled "Methods and Systems of Creating Single-Frequency Satellite Broadcasting Networks using Large Numbers of Spotbeams," the entire contents of which being incorporated herein by reference.

FIELD

Embodiments described herein relate to wireless communications systems and, more particularly, to the use of single frequency network techniques for satellite broadcast communications systems.

BACKGROUND

Wireless broadcasting is well known for television and radio content. As used herein, the term "broadcasting" means simultaneously sending the same content to multiple recipients. A distinction is sometimes made between broadcasting and multicasting, wherein broadcasting sends the content to everyone on a network, whereas multicasting sends content to a select list of recipients. As used herein, "broadcasting" is used generically to mean simultaneously sending the same content to all or a subset of all User Equipment on a network. As used herein, the term "user equipment" or "UE" includes satellite radiotelephones or data terminals, including smart telephones and access points for internet of things (IoT), wherein the terminal includes a radio frequency transceiver and may also include a global positioning system (GPS) or global navigation satellite system (GNSS) receiver. Some embodiments of the systems and methods presented herein may be described herein as being applied either broadcasting or multicasting. However, it should be understood that the techniques described herein are not limited to either broadcasting or multicasting but may be applied to both.

Single-frequency broadcast networks have many advantages in terrestrial applications, such as conserving spectrum (using N=1 frequency reuse), operation with lower transmit powers, and better coverage of cluttered environments. Lower power operation is enabled by coherently combining at the User Equipment (UE) signals received from multiple transmit towers, wherein the transmit signals are synchronized. In this type of network, the signals from different towers appear to the UE as multipath components of the same signal. The rich repertoire of processing techniques available to demodulate signals in the presence of multipath can be applied. For example, orthogonal frequency-division multiplexing (OFDM) is a multipath resistant modulation technique used by Single Frequency Networks (SFNs).

If it is desired to provide a broadcast service over a spotbeam satellite, such as Ligado's SkyTerra-1 or Inmarsat's 14, multiple small spotbeams may be used to create an arbitrarily shaped footprint (e.g., as illustrated in FIG. 1). The advantages of being able to create an arbitrarily shaped footprint are: (1) minimizing satellite power relative to existing systems that broadcast power over a wide area; and (2) limiting downlink interference to areas not intended to receive the service. For example, as illustrated in FIG. 1, some spotbeams 100 are illuminated, while other spotbeams 102 are not.

Creating an arbitrary coverage area with sharp edges requires small spotbeams, i.e., a satellite with high antenna gain. Such satellites are currently available, for example, the geosynchronous SkyTerra-1 and Terrastar-1 satellites, which can form approximately 300 km diameter beams on Earth's surface. However, if the illuminated spotbeams 100 in FIG. 1 were to be joined to provide a common broadcast service, a frequency reuse factor greater than 1 would have to be used. This is because of the substantial overlap that would exist between adjacent beams.

Both power and spectral efficiency could be improved by using single frequency networks in satellite broadcast networks. These benefits have been realized in terrestrial broadcast networks through the use of standards such the 3GPP (Third Generation Partnership Project) Evolved Multimedia Broadcast Multicast Services (eMBMS) (and its derivatives) and various Advanced Television Systems Committee (ATSC) standards. In terrestrial broadcasting, a single-frequency network combines signals arriving from a plurality of base stations, as well as local, environmental multipath, to create a composite signal at the receiving terminal (often a UE), in which a substantial component of the received signal energy is coherently combined from multiple sources. Thereby, what would be a source of interference in legacy systems (e.g., signals from adjacent cells and local multipath) is leveraged as means of signal enhancement. This is the reason for increased power efficiency in single frequency networks. In addition, the ability to use the same frequency in adjacent cells leads to increased spectral efficiency.

Fundamental to the ability to combine the powers of signals from different sources is the requirement that the transmit signals be received with delay differences that are large compared to the bandwidth of the signal. This facilitates coherent recombination of some of the signal components. For terrestrial, single frequency broadcast applications, the signal bandwidth is chosen so that the above requirement is met, given the known delay differences from different adjacent cells and the typical time dispersion of local multipath. For example, a 5 MHz or 10 MHz bandwidth signal easily meets this requirement, as the delay difference is relatively large when compared 0.2 microseconds (the inverse of a 5 MHz signal). Note also that the propagation time for 1 km, the typical radius of a microcell, is 3.3 microseconds. Therefore, normal anti-multipath techniques used in modern cellular receivers, such as the use of OFDM signals and frequency hopping of resource blocks (RBs) coupled with forward error correction (FEC) across hops, suffices to provide optimal combining of signals from different sources.

SUMMARY

As noted, terrestrial SFNs leverage what has been a source of interference in legacy systems (environmental multipath) as means of signal enhancement. However, the natural delay diversity present in terrestrial single frequency networks is absent in satellite broadcast systems. This is because all downlink signals originate at substantially the same point in space—the satellite. One might think that a simple approach of transmitting all signals synchronously and combining them in phase at the receiver might be optimal. However, approach is susceptible to two technical problems: (1) The beamforming system may introduce phase shifts in signals received off-boresight relative to on-boresight; (2) There may be a multipath component in the composite received signal at the UE caused by Rician fading. Therefore, blind, equal-gain/phase combining of the signals may not be optimal.

To address these problems, embodiments of the present invention provide for the use of Single Frequency Network techniques for satellite broadcast and multicast communications systems. Using embodiments presented herein, multiple spotbeams on the same frequency are generated for a coverage area. User equipment receiving multiple bearer signals from adjacent beams are able to constructively utilize the bearer signals. Differential delays, selectively introduced into the bearer signals, enable the receiving user equipment to optimally combine the signals received from different beams. As described herein, differential delays are chosen to optimize throughput at the application layer for broadcast and multicast services. The delays may be selected based on predicted spectra of the received signals that would result from the use of the delays. Using such embodiments, a spotbeam satellite can provide broadcast or multicast services over a larger coverage area while more efficiently using spectrum and satellite power.

One example embodiment provides a method for operating a satellite network broadcast or multicast service to transmit a plurality of spotbeams within a coverage area. The method includes receiving, with a user equipment, bearer signals from a plurality of adjacent spotbeams of the plurality of spotbeams. Each of the plurality of spotbeams carries a bearer signal bearing identical broadcast or multicast program information. The method includes constructively utilizing, with the user equipment, the bearer signals received from the plurality of adjacent spotbeams to decode the program information. The bearer signals transmitted in each spotbeam of the plurality of adjacent spotbeams are transmitted with a differential delay with respect to the bearer signals of each of the other spotbeams of the plurality of adjacent spotbeams. The differential delay for each spotbeam of the plurality of adjacent spotbeams is selected to increase a throughput at an application layer of the broadcast or multicast service.

Another example embodiment provides a satellite broadcast system. The system includes an electronic processor communicatively coupled to a satellite, and a user equipment. The electronic processor is configured to receive a plurality of bearer signals, each bearing identical broadcast or multicast program information. The electronic processor is configured to, for each of the plurality of bearer signals, generate one of a plurality of spotbeams for transmission by the satellite within a coverage area. The electronic processor is configured to introduce into the bearer signal of each spotbeam of the plurality of spotbeams a differential delay with respect to the bearer signals of each of the other spotbeams of the plurality of spotbeams. The user equipment is configured to receive the bearer signals from a plurality of adjacent spotbeams of the plurality of spotbeams. The user equipment is configured to constructively utilize the bearer signals received from the plurality of adjacent spotbeams to decode the program information.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
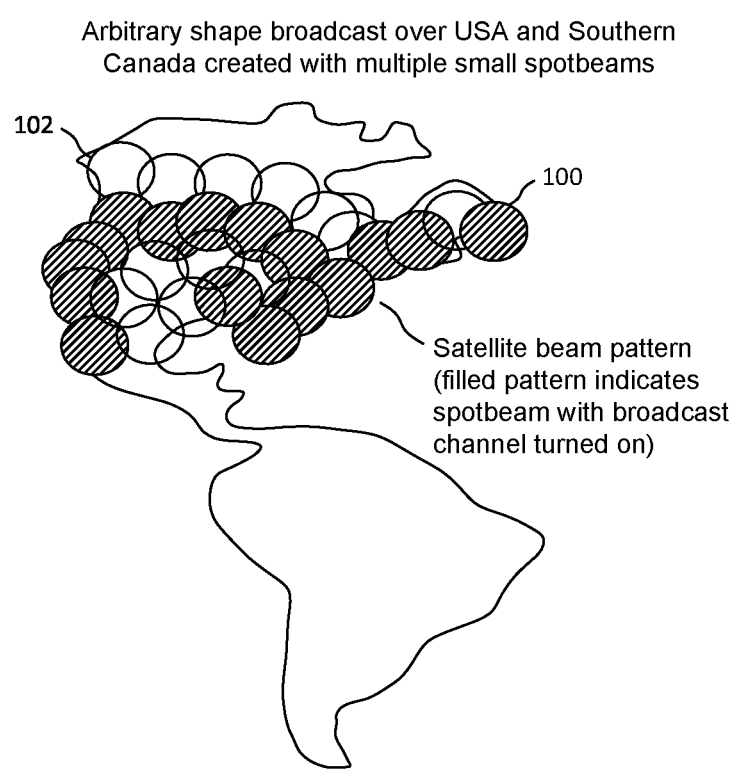
FIG. 1 illustrates multiple spotbeam pattern for satellite broadcasting in North America.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

It should also be noted that a plurality of hardware and software-based devices, as well as a plurality of different structural components may be used to implement aspects of the disclosure. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronics-based aspects may be implemented in software (e.g., stored on non-transitory computer-readable medium) executable by one or more electronic processors (e.g., microprocessors). As such, it should be noted that a plurality of hardware and software-based devices, as well as a plurality of different structural components may be utilized to implement the disclosure. For example, "control units" and "controllers" described in the specification can include one or more processors, one or more memory modules including non-transitory computer-readable medium, one or more input/output interfaces, and various connections (e.g., a system bus) connecting the components.

For ease of description, the example systems or devices presented herein may be illustrated with a single exemplar of each of its component parts. Some examples may not describe or illustrate all components of the systems. Other example embodiments may include more or fewer of each of the illustrated components, may combine some components, or may include additional or alternative components.

Figure 2:
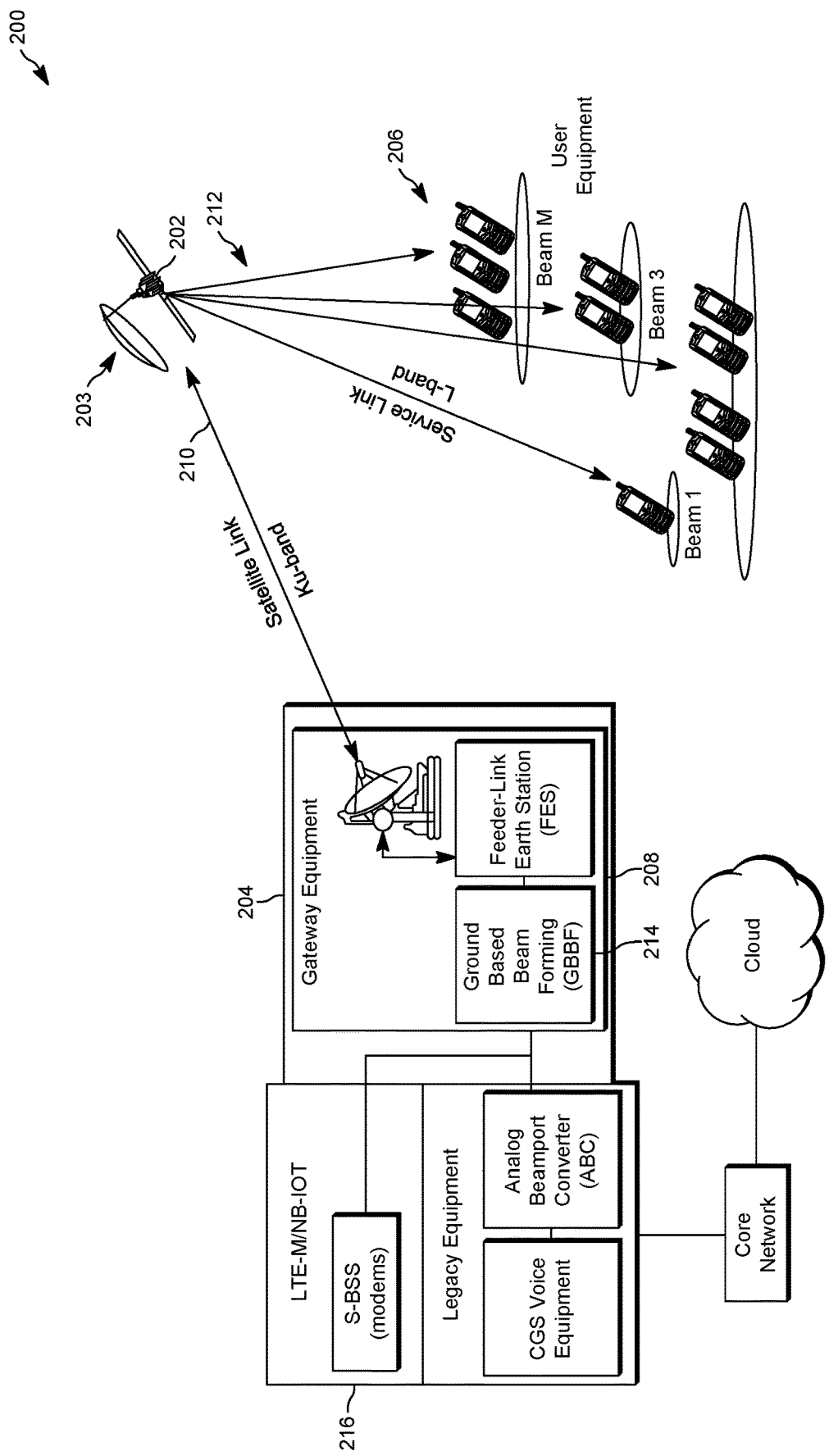
FIG. 2 illustrates a satellite network system according to some embodiments.

FIG. 2 illustrates and example satellite network 200 for transmitting broadcast and/or multicast signals to Earth-based receivers. Broadcast signals are transmitted on all illuminated beams (e.g., indicated as shaded beams in FIG. 1) as synchronous signals carrying identical information (e.g., as contained in the program source 302 illustrated in FIG. 3).

The satellite network 200 includes a satellite 202, a satellite earth station 204, and a plurality of user equipment 206. The satellite 202 includes electronics and equipment (e.g., an antenna array 203 and corresponding feeder electronics) configured for sending and receiving wireless communications to and from the satellite earth station 204 and the plurality of user equipment 206. For example, as illustrated in FIG. 2, the satellite 202 receives signals from the gateway equipment 208 via a Ku-band satellite link 210 and retransmits those signals to the user equipment 206 via an L-band service link 212 using the antenna array 203. As illustrated in FIG. 2, the satellite 202 transmits to the user equipment 206 using a plurality of spotbeams 1-M. The satellite earth station 204 include includes electronics and equipment configured for sending and receiving wireless communications to and from the satellite 202.

In the example satellite network 200 illustrated in FIG. 2, all of the beams are formed by a digital beamformer on the ground, referred to as a Ground Based Beam Former (GBBF) 214. However, it should also be noted that the teachings presented herein could be applied equally to a system where the beamforming is performed on the satellite (a Space Based Beam Former). Performing beamforming on the ground is not required. The GBBF 214, described more particularly below with respect to FIG. 3, and the satellite 202 are air interface agnostic, i.e., transparent to the waveforms. The Satellite Base Station (S-BSS) 216 performs the RAN functions of resource scheduling and data/signal processing required by the lower layers of the protocol stack and provides bearer signals to the GBBF 214 at complex baseband. One bearer signal is provided for each L-band carrier and each beam. All bearer signals destined for a beam (e.g., different carriers separated in frequency) are added linearly and input to a beam port of the GBBF 214 corresponding to a destination beam. There may be more than one carrier per beam and more than one beam may overlay a given geographic area. The beams may have arbitrary sizes and shapes, ranging in size from a CONUS Beam covering all North America to a Small Beam (e.g., having a 150 km radius). The GBBF 214 may form a large number of beams, but the aperture of the satellite's antenna system, which comprises an antenna array 203 of many radiating elements, limits the smallest beam size to the Small Beam mentioned above. The choice of the specific center frequency (at L-band) used in each spotbeam is made by a resource manager, or equivalent, in the gateway equipment 208, and its usage is implemented by RF/IF subsystems in the gateway equipment 208. The gateway equipment RF/IF subsystems and the satellite payload provide non-time-dispersive (i.e., constant propagation delay at all frequencies) transport from the output of the GBBF 214 to the phased array 203 antennas on the satellite 202.

Figure 3:
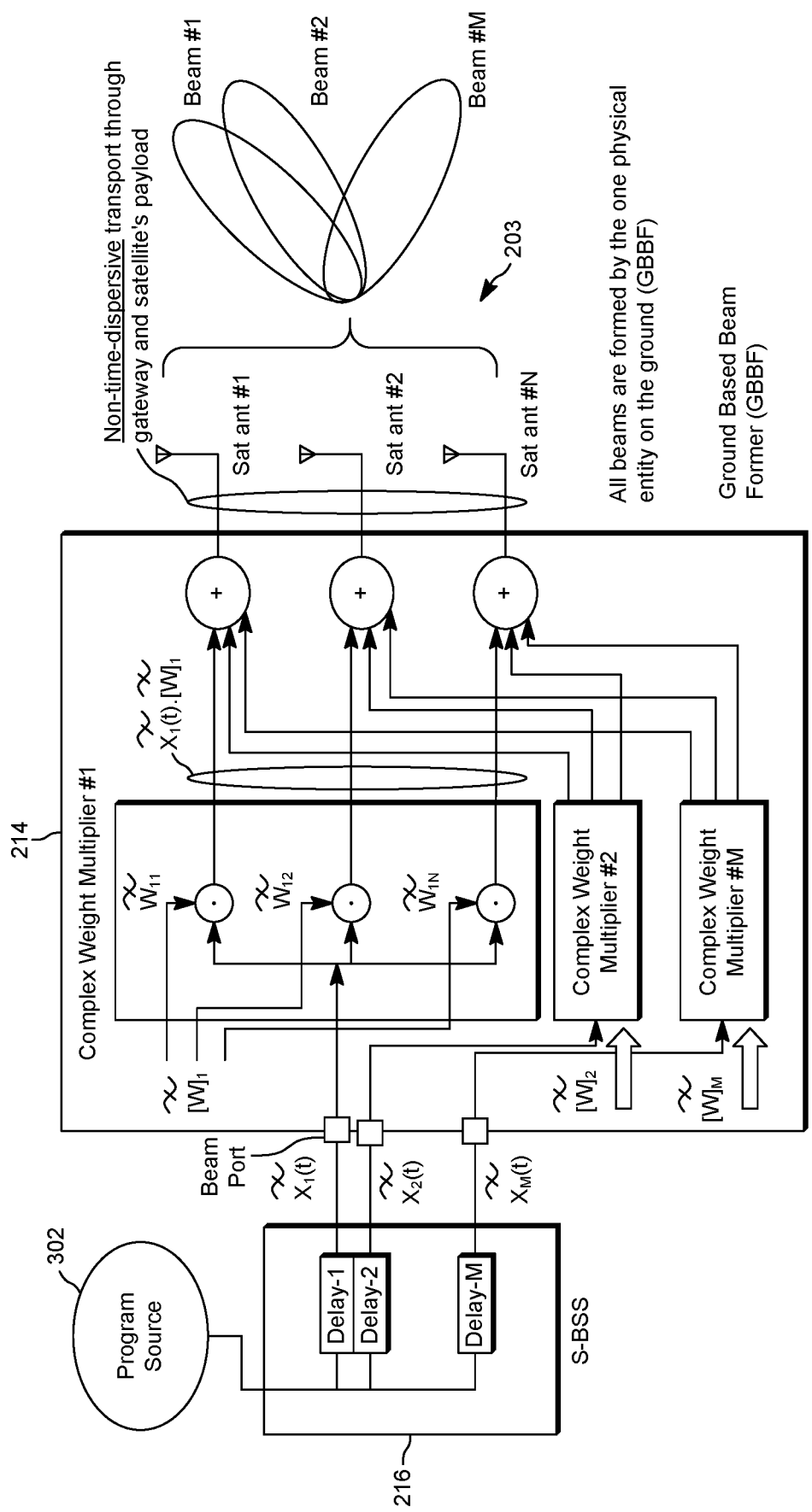
FIG. 3 illustrates a ground-based beamforming system for use with the satellite network system of FIG. 2 according to some embodiments.

FIG. 3 illustrates an example embodiment of the operation of the Ground Based Beam Former (GBBF) 214. As illustrated in FIG. 3, the S-BSS 216 receives a program signal for broadcast from a program source 302 (e.g., a digital audio or video programming provider). The S-BSS 216 processes the program signal to produce complex baseband bearer signals to the GBBF 214 for beamforming. In a broadcast application all bearer signals are identical. As illustrated in FIG. 3, the bearer signals are represented as $x_i(t)$, where i=1 to M, and $x_i(t)$ is a time varying, complex baseband signal, which is input to the $i^{th}$ beam port of the GBBF 214. A beam port is an access point of the GBBF 214. A complex baseband signal provided to the $i^{th}$ beam port appears as the modulation envelope of an L-band signal transmitted on $i^{th}$ beam by the satellite 202. The GBBF 214 applies complex weights to the bearer signals to produce beams 1-M, which are fed to the satellite 202 and transmitted via the satellite antenna array 203 to user equipment on the ground. The beamforming weights are programmed into the GBBF 214 as fixed, complex weights, $[W]_1, [W]_2 \ldots [W]_M$, determined by the desired beam patterns in azimuth and elevation relative to the boresight of the satellite 202.

The diverse delays (Delays 1-M) introduced by the S-BSS 216 in the different beam paths create the equivalent of diverse propagation delays in terrestrial single frequency networks. The different time delays in the bearer signals occur naturally in terrestrial SFNs because of the different propagation delays from the base stations. In the embodiments presented herein, they are inserted artificially. Once that is done, signal processing methods used in the user equipment to receive terrestrial SFN signals can be substantially reused to also receive satellite SFN signals.

Figure 4:
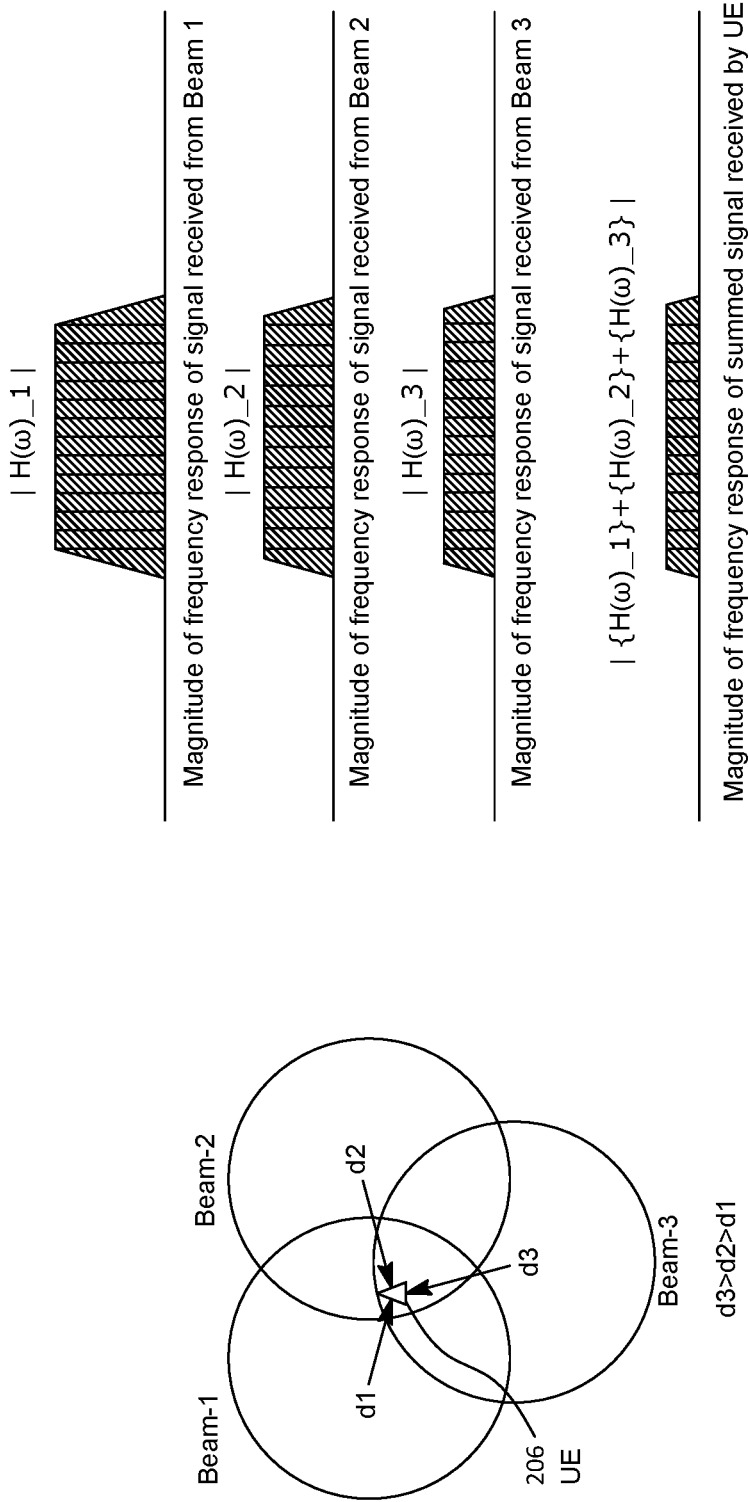
FIG. 4 illustrates aspects of the operation of the satellite network system of FIG. 2 according to some embodiments.
Figure 5:
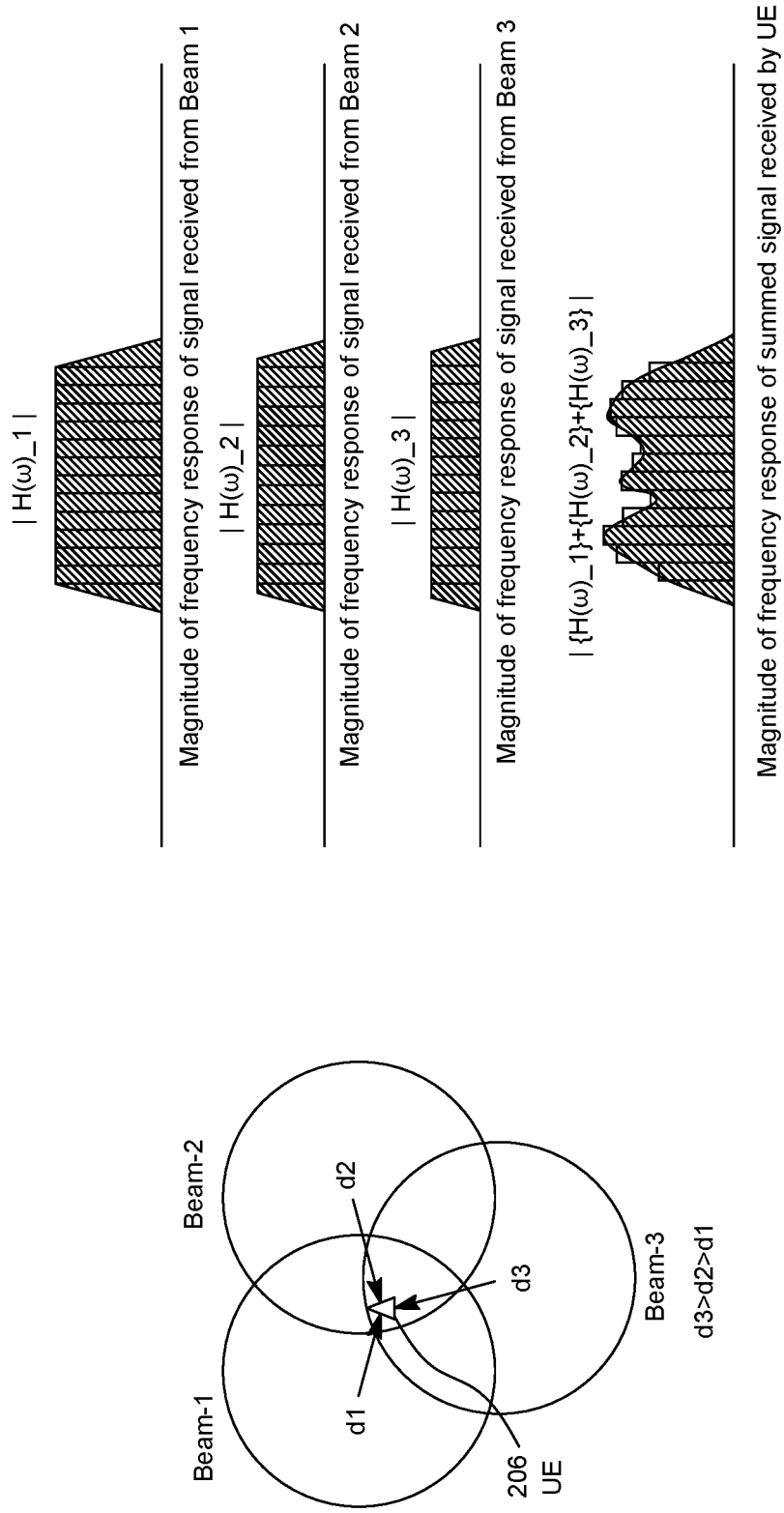
FIG. 5 illustrates aspects of the operation of the satellite network system of FIG. 2 according to some embodiments.

As in terrestrial cases, the delays create frequency selective fading in the passband of the broadcast signal received by a user equipment (UE). FIGS. 4 and 5 illustrate examples of such fading, where FIG. 4 corresponds to the case of no added delays in the beam paths, and FIG. 5 corresponds to the case of added beam path delays. FIGS. 4 and 5 illustrate cases where signals are received at the indicated user equipment (UE 206) location in the overlap area of three adjacent beams: Beam-1, Beam-2, and Beam-3. As illustrated in FIGS. 4 and 5, the location of the UE 206 is at distances of d1, d2 and d3 from the centers of the respective beams. In both FIGS. 4 and 5, the propagation time from the satellite to the UE 206 is materially identical for all beams. As an example, the magnitude of the spectrum of the transmitted signal is assumed to be flat over frequency, although this is not essential for the practice of the embodiments described herein. The complex baseband spectra of the received beam-signals at the UE 206 are represented as $H(\omega)\_1, H(\omega)_2$, and $H(\omega)\_3$. For simplicity, the UE antenna is assumed to comprise a single element. At the UE, the spectra will simply 'add in the air' to form a composite signal $H(\omega)$, represented by $H(\omega)=H(\omega)\_1+H(\omega)\_2+H(\omega)\_3$.

In the case of no added delay in the S-BSS 216 (FIG. 4), $H(\omega)$ will also have a flat magnitude-spectrum but the value of the magnitude will depend on the relative magnitudes and phases of $H(\omega)$ 1, $H(\omega)$ 2, and $H(\omega)\_3$. In the absence of differential delays among the beams, the beam signals will have relative phases that are frequency independent. This relative magnitude and phase will depend on each beam's gain and phase response towards the direction of the UE 206. For example, if the UE 206 is receiving signals from three beams, each pointing (i.e., peaking) in a different direction, the signals, although identical at the point of launch in the S-BSS 216, will be received at the UE 206 with different amplitudes and phases. Thus, $H(\omega)$ 1, $H(\omega)$ 2, and H(ω)_3 may have arbitrary (although frequency independent) relative magnitudes and phases, leading to destructive or constructive interference, which is also relatively frequency independent. Thus, the spectrum of the composite signal, H(ω), will have a magnitude that is relatively flat over frequency but with a value that depends on the relative magnitudes and phases of the component beam signals. The example of FIG. 4 shows a case of largely destructive interference, resulting in H(ω) having a substantially reduced magnitude relative to the component spectra, H(ω) 1, H(ω) 2, and H(ω)_3. Note that, unlike diversity combining techniques involving multiple receiver paths, the UE 206 has no ability to compensate for, or in any way alter, the complex ratio in which the beam signals are added, as they add in the air before entering the UE.

Figure 6:
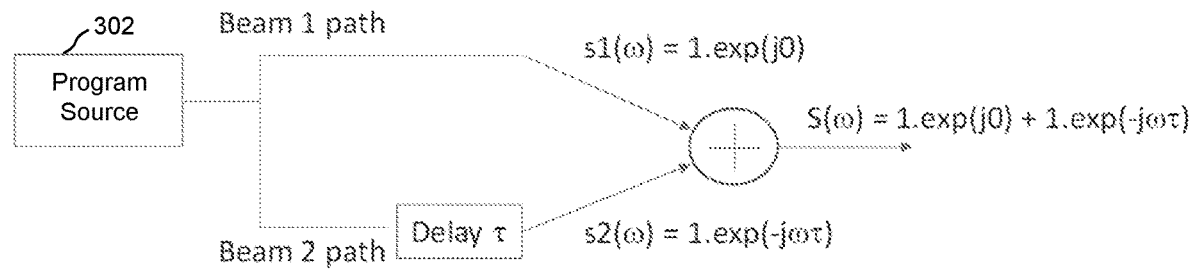
FIG. 6 illustrates aspects of the operation of the satellite network system of FIG. 2 according to some embodiments.

When appropriate delays are added by the S-BSS 216 to the beam signals, the phase spectrum of H(ω) for each beam signal has a pronounced frequency dependence. For example, as illustrated in FIG. 6, if there is a relative delay of τ between two beam signals, s1(ω) and s2(ω), the relative phase spectrum of the beam signals is given by exp(−jωτ), where ω is the relative frequency relative to the band center. As illustrated in FIG. 6, the program source 302 provides broadcast or multicast information, which is transmitted with two beam paths, producing the two beam signals, s1(ω) and s2(ω). The signals are combined (e.g., in the UE 206 to produce one signal s(ω). The magnitude spectrum of two, equal-amplitude signals with a relative of delay of τ has a |Cosine (f)|shape, where f is the frequency relative to the band center (illustrated in FIG. 7).

Because the peak of the magnitude-spectrum reaches a value of 2.0, the power spectral density in this part of the band has a gain of 20 log(2)=6 dB over the signal that would be received for a single beam. Note that due to coherent combination, the signal adds on an 'amplitude' basis rather than a 'power' basis. This is better than frequency diversity, where the gain is 3 dB owing to the necessity of a second receive path, which adds 3 dB of noise power.

While some portions of the received signal spectrum are enhanced, others are necessarily suppressed. The air interface is designed to maximize the application layer throughput through such frequency selective channels, using techniques that include at least some of the following: (i) frequency hopping of information content on relatively narrow subbands, over which the fading is relatively flat, and (ii) avoiding the use of the most deeply suppressed, or nulled, parts of the spectrum. In some embodiments, the artificial delays introduced into the spotbeams, as described herein, are selected based on predicted spectra of the received signals that would result from the use of the delays. In some embodiments, the predicted spectra, which results in highest the application layer throughput, is the basis for selecting the delays.

Note that, while in a terrestrial application, the distribution of path delays to the UE 206 may not be known a priori (without feedback from the UE 206), as the path delay distribution is synthesized at the source (e.g., the S-BSS 216) in a satellite application, it may be much better known. A degree of uncertainty may still exist due to local Rician multipath fading at the UE 206. For high carrier-to-multipath ratios, typical in satellite networks, the contribution of this factor is usually small.

Figure 7:
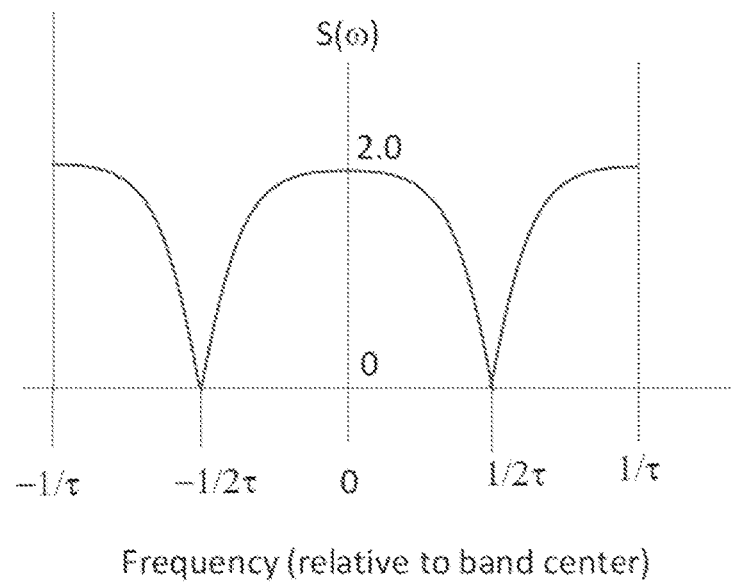
FIG. 7 illustrates aspects of the operation of the satellite network system of FIG. 2 according to some embodiments.

While FIG. 7 shows a simple, idealized example of frequency selective fading, FIG. 5 illustrates what might be encountered in a real-life example.

Orthogonal frequency-division multiplexing (OFDM) signal processing techniques can make optimal use of such non-uniform spectra based on processing individual subbands (or sub-carriers), known as resource elements (REs), an overlaid example of which is shown in FIGS. 4 and 5. The REs are designed to be sufficiently narrowband that the fading is substantially flat within each RE, and many REs are received with an amplitude greater than would be received from any single beam. One embodiment of optimal signal processing in a frequency selective channel, suitable for OFDM, is to frequency hop a resource element over the channel bandwidth and use forward error correction to recover the transmitted information with acceptable integrity.

Figure 8:
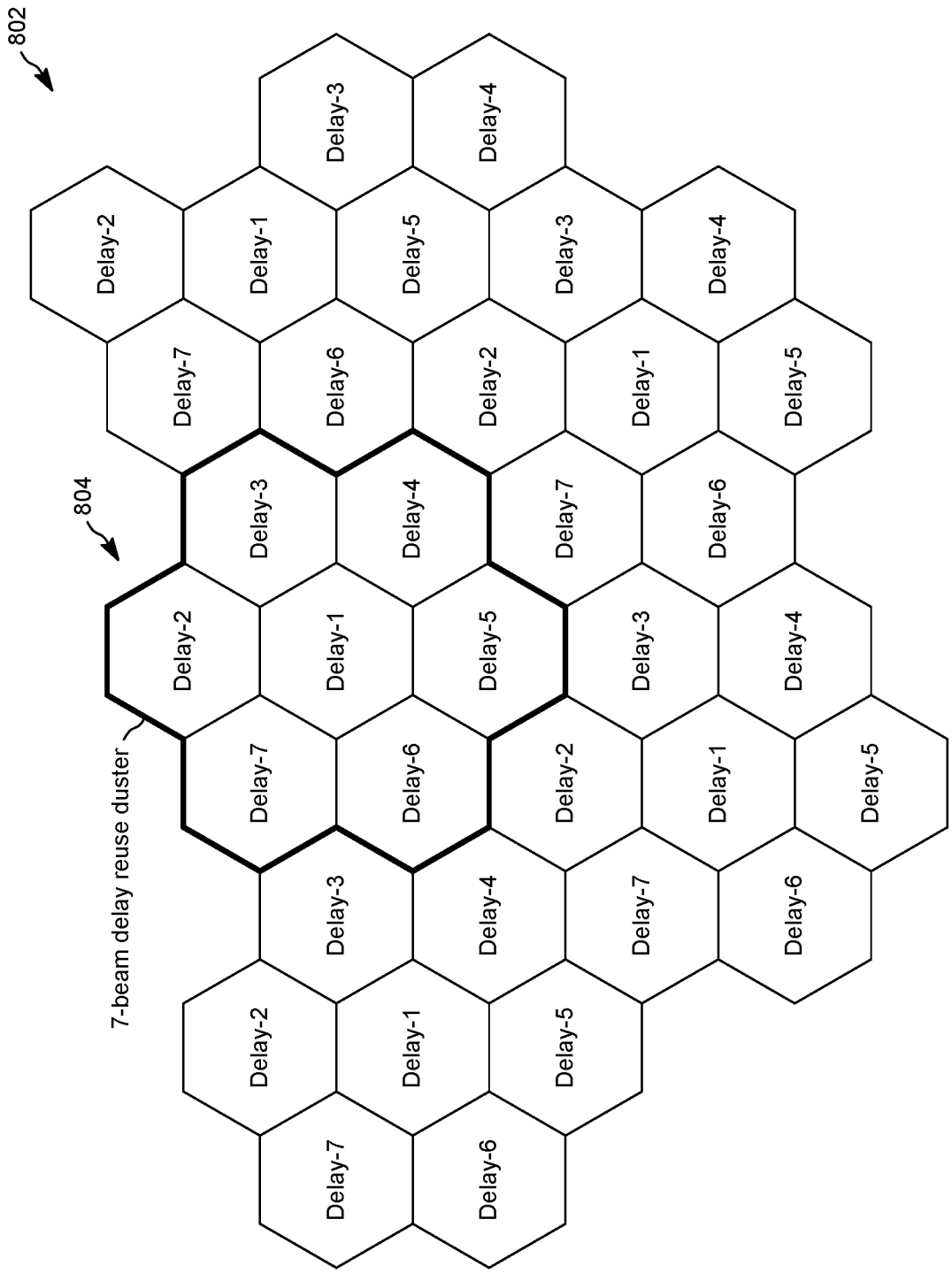
FIG. 8 illustrates a bearer signal delay reuse plan for operating the satellite network system of FIG. 2 according to some embodiments.

It should be clear from the above that the number of peaks and nulls in the composite spectrum are dependent on the distribution of the differential delays. Ideally, it would be desirable to have a unique delay for each beam. However, this may lead to an excessive value for the maximum differential delay, especially where the number of beams is large. Therefore, some embodiments reuse delay values similar to the way that frequencies are reused to avoid adjacent channel interference. FIG. 8 illustrates an example delay reuse plan 802. Beam delays are arranged into delay reuse clusters of adjacent beams, each with a subset of delays (e.g., delays 1-7). Each delay in the subset is used only once within a delay reuse cluster (e.g., cluster 804). Outside a given delay reuse cluster, the delay values may be reused, as the mutual rejections encountered by beams belonging to different clusters but using the same delay would be sufficiently great to negate the possibility of material beam-signal combining.

Reuse clusters may be duplicated and arranged such that the impact of the delays on SNIR maximization is more than de minimis. As an example, FIG. 8 illustrates a delay reuse cluster size of 7. As in the case of frequency reuse, the cluster size will depend on the spatial selectivity of the beam. The lower the beam selectivity, the more advantageous it will be to include more beams in a cluster. In some embodiments, a criterion for selecting the cluster size would be to include beams where ideal, coherent combination of the signals would cause at least a 1 dB increase in SNIR. That is, less than a 1 dB contribution by a beam to SNIR maximization would be considered de minimis.

It should be noted that the above teaching regarding delay reuse does not exclude embodiments with a unique delay for each beam in the entire coverage area. Such embodiments are useful, for example, in systems where the beams have relatively low selectivity.

As discussed above, the greater the differential delay between the beams, the better the ability of a user equipment to maximize the received signal amplitude. Therefore, it is desirable to optimize the choice of the beam delays between at least the following constraints: maximum tolerable differential delay, which may depend on the numerology of the OFDM signal—cyclic prefix guard interval, which may drive the processing load of the user equipment; the minimum differential delay necessary to guarantee an objective level of signal enhancement, (i.e., maximization of the signal-to-noise-and-interference ratio (SNIR)); and conformance to delays standardized in present terrestrial broadcasting standards, as this may have ecosystemic advantages.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A method for operating a satellite network broadcast or multicast service to transmit a plurality of spotbeams within a coverage area, the method comprising:
receiving, with a user equipment, bearer signals from a plurality of adjacent spotbeams of the plurality of spotbeams, wherein each of the plurality of spotbeams carries a bearer signal bearing identical broadcast or multicast program information; and
constructively utilizing, with the user equipment, the bearer signals received from the plurality of adjacent spotbeams to decode the program information,
wherein the bearer signals transmitted in each spotbeam of the plurality of adjacent spotbeams are transmitted with a differential delay with respect to the bearer signals of each of the other spotbeams of the plurality of adjacent spotbeams, and
wherein the differential delay for each spotbeam of the plurality of adjacent spotbeams is selected to increase a throughput at an application layer of the broadcast or multicast service.

2. The method of claim 1, wherein selecting the differential delay to increase a throughput at an application layer of the broadcast or multicast service includes selecting the differential delay for each spotbeam based on predicted spectra of a received signal at the user equipment that would result from the use of the delay.

3. The method of claim 1, wherein
the plurality of adjacent spotbeams are part of a cluster of adjacent spotbeams; and
the bearer signals transmitted in each spotbeam of the cluster are transmitted with a differential delay with respect to the bearer signals of each of the other spotbeams of the cluster.

4. The method of claim 3, wherein the differential delay of the bearer signals for each pair of beams within the cluster is unique throughout the coverage area.

5. The method of claim 3, wherein
each differential delay within a set of differential delays for the cluster is unique within the cluster;
the plurality of spotbeams comprises the cluster and a second cluster; and
the spotbeams of the second cluster are transmitted using a second set of differential delays, which are identical to the set of differential delays for the cluster.

6. The method of claim 3, wherein the quantity of spotbeams making up the cluster is dependent on the spatial selectivities of the spotbeams.

7. The method of claim 6, where a criterion for including a spotbeam in the cluster is that including the spotbeam would cause at least a 1 dB increase in the signal-to-noise-and-interference ratio at the user equipment.

8. The method of claim 3, where the differential delays are introduced in a ground-based beam former.

9. The method of claim 1, wherein constructively utilizing the bearer signals includes introducing frequency redundancy in a transmitted signal such that demodulation with acceptable quality is possible even when the received signal amplitudes are relatively low in certain segments of a frequency band of the transmitted signal.

10. The method of claim 9, wherein the frequency redundancy is introduced by frequency hopping across the signal bandwidth resource blocks carrying segments of the transmitted information stream and applying error correction to recover resource blocks containing errors.

11. A satellite broadcast system, the system comprising:
an electronic processor communicatively coupled to a satellite and configured to
receive a plurality of bearer signals, each bearing identical broadcast or multicast program information;
for each of the plurality of bearer signals, generate one of a plurality of spotbeams for transmission by the satellite within a coverage area; and
introduce into the bearer signal of each spotbeam of the plurality of spotbeams a differential delay with respect to the bearer signals of each of the other spotbeams of the plurality of spotbeams; and
a user equipment configured to
receive the bearer signals from a plurality of adjacent spotbeams of the plurality of spotbeams; and
constructively utilize the bearer signals received from the plurality of adjacent spotbeams to decode the program information.

12. The system of claim 11, wherein the electronic processor is further configured to select the differential delay for each spotbeam based on predicted spectra of a received signal at the user equipment that would result from the use of the delay.

13. The system of claim 11, wherein
the plurality of adjacent spotbeams are part of a cluster of adjacent spotbeams; and
the electronic processor is further configured to introduce into the bearer signal of each spotbeam of the cluster a differential delay with respect to the bearer signals of each of the other spotbeams of the cluster.

14. The system of claim 13, wherein the differential delay of the bearer signals for each pair of beams within the cluster is unique throughout the coverage area.

15. The system of claim 13, wherein
each differential delay within a set of differential delays for the cluster is unique within the cluster;
the plurality of spotbeams comprises the cluster and a second cluster; and
the electronic processor is further configured to introduce into the spotbeams of the second cluster a second set of differential delays, which are identical to the set of differential delays for the cluster.

16. The system of claim 13, wherein the electronic processor is further configured to determine the quantity of spotbeams making up the cluster based on the spatial selectivities of the spotbeams.

17. The system of claim 16, wherein the electronic processor is further configured to include a spotbeam in the cluster when including the spotbeam would cause at least a 0 dB increase in the signal-to-noise-and-interference ratio at the user equipment.

18. The system of claim 11, where the electronic processor is included in a ground-based beam former.

19. The system of claim 11, wherein the user equipment is configured to constructively utilize the bearer signals by introducing frequency redundancy in a transmitted signal such that demodulation with acceptable quality is possible even when the received signal amplitudes are relatively low in certain segments of a frequency band of the transmitted signal.

20. The system of claim 19, wherein the frequency redundancy is introduced by frequency hopping across the signal bandwidth resource blocks carrying segments of the transmitted information stream and applying error correction to recover resource blocks containing errors.

* * * * *